(12) United States Patent
Chang et al.

(10) Patent No.: US 9,129,082 B2
(45) Date of Patent: Sep. 8, 2015

(54) VARIATION FACTOR ASSIGNMENT

(71) Applicant: Taiwan Semiconductor Manufacturing Company Limited, Hsin-Chu (TW)

(72) Inventors: Chi-Wen Chang, Yuanlin Township (TW); Hui Yu Lee, Hsin-Chu (TW); Jui-Feng Kuan, Zhubei (TW); Yi-Kan Cheng, Taipei (TW); Chin-Hua Wen, Toufen Township (TW); Wen-Shen Chou, Zhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 13/780,110

(22) Filed: Feb. 28, 2013

(65) Prior Publication Data

US 2014/0245242 A1    Aug. 28, 2014

(51) Int. Cl.
*G06F 17/50* (2006.01)

(52) U.S. Cl.
CPC ........ *G06F 17/5081* (2013.01); *G06F 2217/12* (2013.01)

(58) Field of Classification Search
CPC ............ G06F 17/5045; G06F 17/5068; G06F 17/5081; G06F 2217/12
USPC .................. 716/100, 106, 110, 111
See application file for complete search history.

(56) References Cited

U.S. PATENT DOCUMENTS

| 6,795,952 B1* | 9/2004 | Stine et al. .................... 716/56 |
| 8,001,512 B1* | 8/2011 | White .......................... 716/119 |
| 2005/0085032 A1* | 4/2005 | Aghababazadeh et al. ... 438/232 |
| 2005/0120328 A1* | 6/2005 | Seltmann et al. ............... 716/21 |
| 2005/0273308 A1* | 12/2005 | Houston ........................ 703/14 |
| 2007/0174797 A1* | 7/2007 | Luo et al. ......................... 716/4 |
| 2007/0208532 A1* | 9/2007 | Park et al. .................... 702/158 |
| 2008/0140363 A1* | 6/2008 | Lin et al. .......................... 703/2 |
| 2009/0031261 A1* | 1/2009 | Smith et al. ...................... 716/2 |
| 2011/0253999 A1* | 10/2011 | Chatterjee et al. ............. 257/48 |
| 2013/0158953 A1* | 6/2013 | Gattiker et al. .................. 703/1 |

* cited by examiner

*Primary Examiner* — Paul Dinh
(74) *Attorney, Agent, or Firm* — Cooper Legal Group LLC

(57) ABSTRACT

One or more embodiments of techniques or systems for variation factor assignment for a device are provided herein. In some embodiments, a peripheral environment is determined for a device. A peripheral environment is a layout structure or an instance. When the peripheral environment is the layout structure, a variation factor is assigned to the device based on an architecture associated with the layout structure. When the peripheral environment is the instance, the variation factor is assigned to the device based on a bounding window created for the instance. In this manner, variation factor assignment is provided, such that a first device within a first block of a die has a different variation factor than a second device within a second block of the die, thus giving finer granularity to variation factor assignments.

20 Claims, 8 Drawing Sheets

VARIATION FACTOR ASSIGNMENT

BACKGROUND

Generally, in semiconductor fabrication, wafers are operated on at a lot level, where a lot comprises one or more wafers. A wafer of a lot of one or more wafers comprises one or more die. Due to one or more variations in semiconductor processing, die within the same wafer or same lot may comprise slightly different characteristics. In order to compensate for the difference in characteristics between dies, statistical simulation is adopted to reflect the process variation during a design stage. One or more global variation factors will be generally applied for the simulation. However, simulation becomes more difficult with advanced technology

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
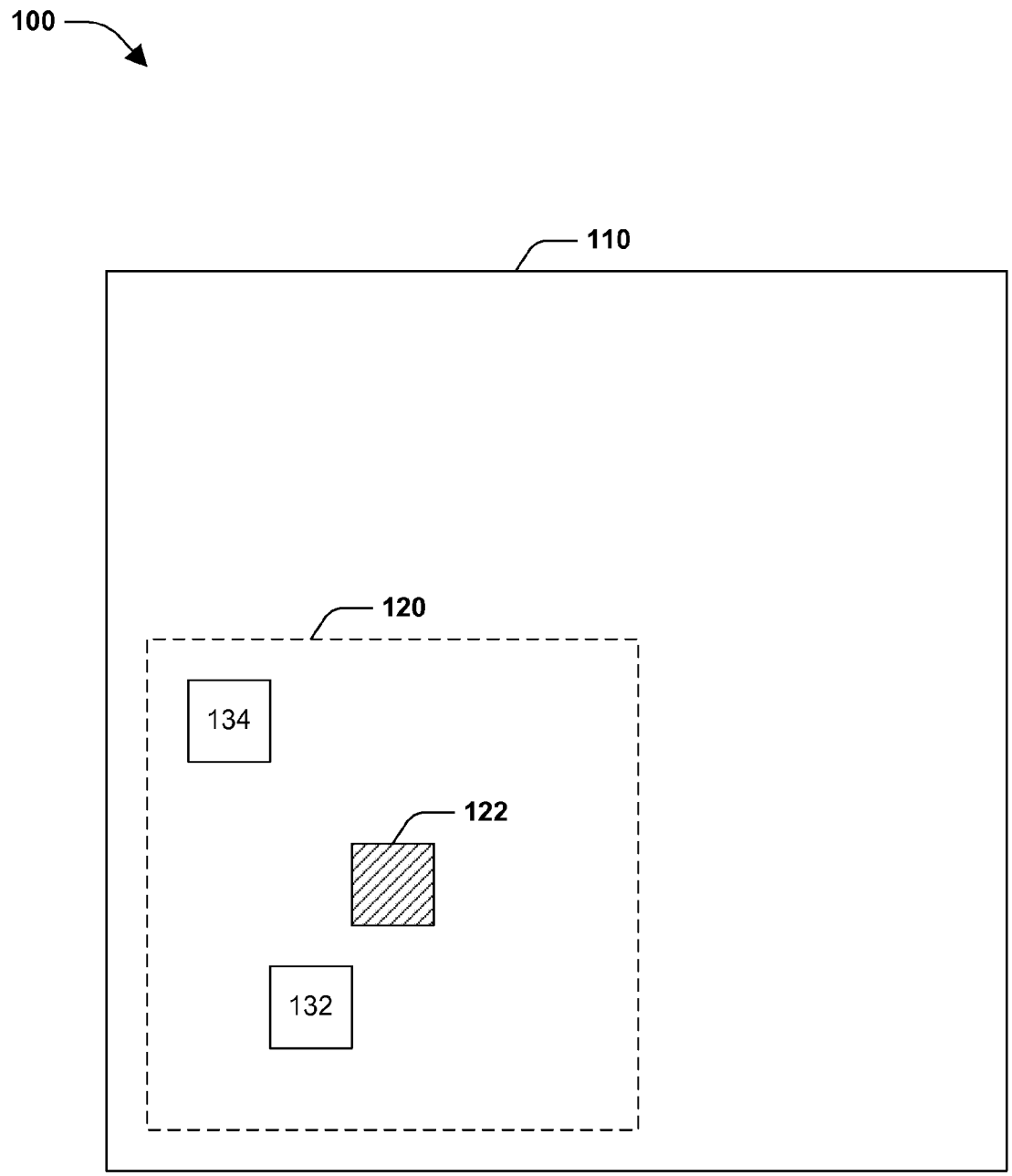
FIG. 1 is a layout view of a die comprising one or more metal oxide semiconductor (MOS) devices, according to some embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

It will be appreciated that 'layer', as used herein, contemplates a region, and does not necessarily comprise a uniform thickness. For example, a layer is a region, such as an area comprising arbitrary boundaries. A layer is also, for example, a region comprising at least some variation in thickness.

Figure 3:
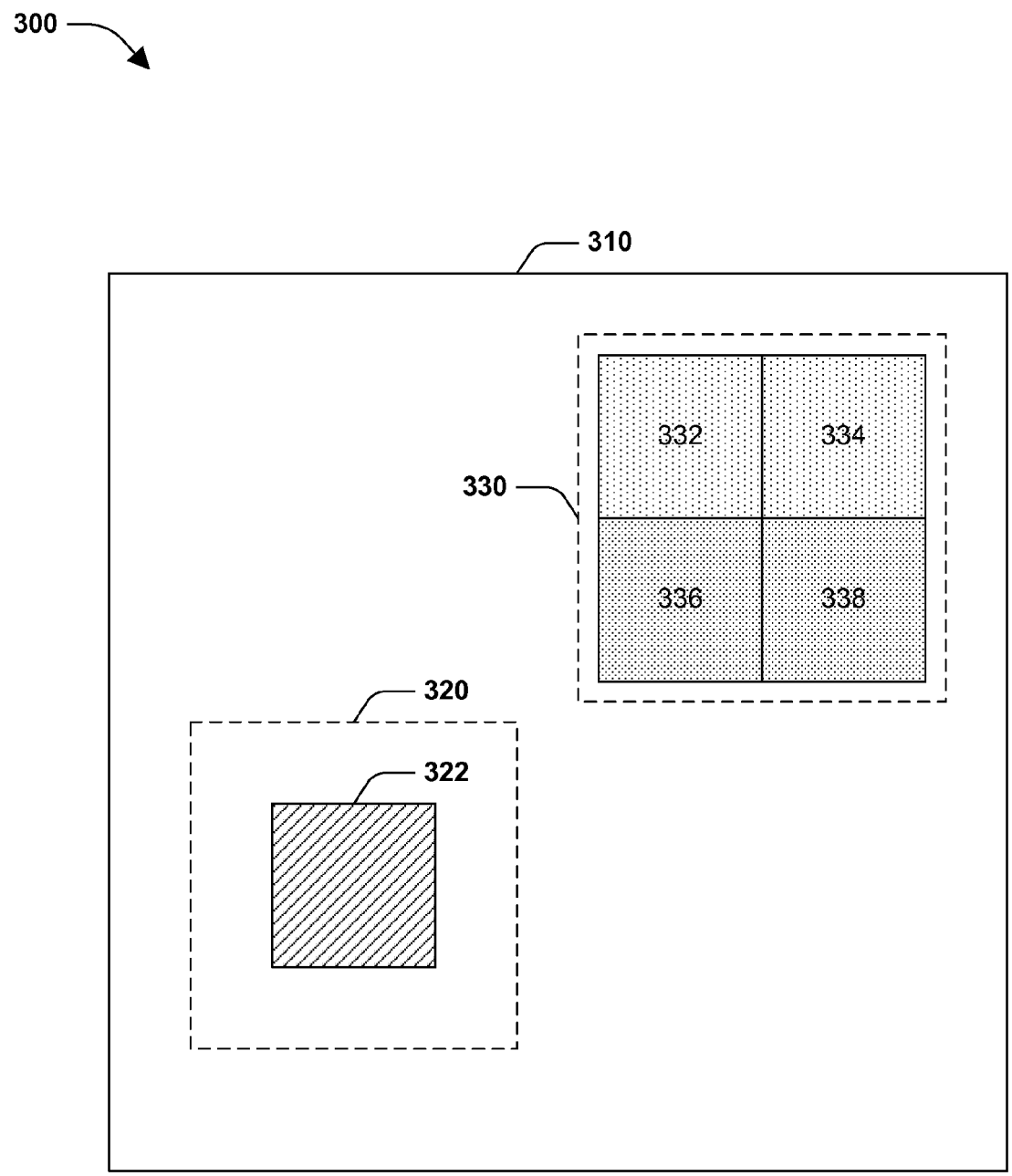
FIG. 3 is a layout view of a die comprising one or more metal oxide semiconductor (MOS) devices, according to some embodiments.

It will be appreciated that for some of the figures herein, one or more boundaries, such as boundary 310 of FIG. 3, for example, are drawn with different heights, widths, perimeters, aspect ratios, etc. relative to one another merely for illustrative purposes, and are not necessarily drawn to scale. For example, because dashed or dotted lines and solid lines are used to represent different boundaries, if the dashed, dotted, or solid lines were drawn on top of one another they would not be distinguishable in the figures, and thus are drawn with different dimensions or slightly apart from one another, in some of the figures, so that they are distinguishable from one another. As another example, where a boundary is associated with an irregular shape, the boundary, such as a box drawn with a dashed line, dotted lined, etc., does not necessarily encompass an entire component in some instances. Conversely, a drawn box does not necessarily encompass merely an associated component, in some instances, but encompasses at least a portion of one or more other components as well.

Generally, in semiconductor fabrication, wafers are fabricated in lots, where a lot comprises one or more wafers. Similarly, respective wafers comprise one or more die. It will be appreciated that a characteristic, such as a corner, a voltage, a parasitic value, etc., often varies from lot to lot, wafer to wafer, and die to die. Additionally, the characteristic often varies from device to device within a same die. For example, a first device within a die, such as a first transistor, is often associated with a slightly different characteristic than a second device within the same die, such as a second transistor. One or more embodiments of methods or techniques are provided herein to model variation of one or more devices within a die. In some embodiments, the first device is assigned a first variation factor based on a first peripheral environment within which the first device is arranged. A peripheral environment is generally an instance associated with a block of one or more devices or a layout structure comprising a one or more devices arranged in a regular architecture. The first variation factor is indicative of an amount of expected variance associated with a characteristic for the first device. Effectively, since the first variation factor is based on the first peripheral environment surrounding the first device, the first variation factor is modeled at a block level. This means that a first block of devices of a first peripheral environment within a die are assigned a first variation factor, while a second block of devices of a second peripheral environment within the same die are assigned a second variation factor different from the first variation factor. It will be appreciated that a block of devices is a group of devices. The grouping is often determined by physical layout, physical location, by area, etc., although groupings are determined according to functionality, such as for a block of memory, in some embodiments.

FIG. 1 is a layout view 100 of a die comprising one or more metal oxide semiconductor (MOS) devices, according to some embodiments. For example, die 110 comprises one or more blocks of devices. The die 110 comprises a first block of devices associated with a first peripheral environment 120, such as transistors. As an example, the first block comprises a first device 122, a second device 132, and a third device 134. In some embodiments, the second device 132 and the third device 134 are assigned a global variation factor indicative of an expected variation across different lots, wafers, etc. The second device 132 and the third device 134 inherit the global variation factor when a peripheral environment associated with respective devices has little or no impact on the respective devices or when the respective devices are less sensitive, for example. However, to more accurately model the first device 122, a first variation factor is assigned to the first device 122 based on the first peripheral environment 120 for the first device 122. Explained in another way, the first variation factor is a block level variation factor that takes sensitivities of a device within a die into account. It will be appreciated that the first variation factor generally has a finer degree of granularity than the global variation factor. Because a finer degree of granularity is being applied when assigning a variation factor, overdesigning transistors of a die is mitigated. In other words, by individually assigning variation factors to different transistors within the same die, some of the different transistors are not designed with as tight of a tolerance as other transistors within the die. In other words, a first transistor, for example, that does not have to be made as accurately, precisely, etc. as a second transistor, for example, can be designed with an increased tolerance for variations, for example, as compared to a design for the second transistor. Accordingly, this enables the die to be simulated at a block or instance level, rather than a global level.

Generally, a peripheral environment for a device is an environment surrounding the device, and comprises among other things, one or more peripheral devices. The first peripheral environment 120 for the first device 122 is defined by the first block of devices, excluding the first device 122, for example. Because the second device 132 and the third device 134 are encompassed by the first peripheral environment 120, they are part of the first peripheral environment 120 and are therefore peripheral devices, with respect to the first device 122. As illustrated in FIG. 1, the first device 122, the second device 132, and the third device 134 are not arranged in a structurally regular fashion, such as a layout structure. Because devices 122, 132, and 134 are not arranged according to a layout structure, the first peripheral environment 120 is a first instance. In other words, an instance is a peripheral environment surrounding a device, with no regularity or pattern, for example. When a peripheral environment of a device is determined to be an instance, a variation factor for the device is determined based on a bounding window associated with the instance. That is, characteristics of other devices within the bounding window are used to determine the variation factor for devices within the instance or bounding window.

In some embodiments, the first variation factor is assigned to a first device based on characteristics, such as a drive current ($I_d$) a process corner, such as fast-fast, slow-slow, etc., a process voltage, a threshold voltage ($V_{th}$), such as a low threshold voltage (lvt), an ultra low threshold voltage (ulvt), etc., or a device type, such as NMOS, PMOS, diode, etc., associated with the first device. In some embodiments, a variation factor is used model multiple characteristics for a device. However, in some embodiments, multiple variation factors are used to model multiple characteristics for a device. For example, a first device is assigned a process corner variation factor, a voltage variation factor, a parasitic resistance variation factor, a parasitic capacitance variation factor, etc.

For example, in FIG. 1, a perimeter of the first peripheral environment 120 is a first bounding window for the first device 122. In this example, the second device 132 and the third device 134 are within the first bounding window of the first peripheral environment 120. Because the second device 132 and the third device 134 are within the first bounding window, characteristics associated with the second device 132 and the third device 134 are used to determine the variation factor for the first device 122. In some embodiments, a density, such as a layout density, a gate density, an OD density, or a metal density of the second device 132 or the third device 134 are calculated to determine the first variation factor for the first device 122. For example, an average density is determined for peripheral devices, such as devices 132 and 134, within the bounding window of the first peripheral environment 120 for the first device 122. In some embodiments, peripheral devices within the bounding window of the first peripheral environment 120 include one or more dummy transistors or layout patterns (not shown). A layout pattern is used, in some embodiments, because some dummy shapes are not formed as a device. In this way, the average density is determined based on dummy devices or dummy transistors within the bounding window. When the average density within the first bounding window is determined, the first variation factor is assigned to the first device 122. In this way, the first variation factor for the first device is determined based on the first bounding window.

In some embodiments, the first bounding window defines a first block or a first peripheral environment 120 for a first device 122. Additionally, the first bounding window is adjusted depending on a desired sampling size, such as a number of peripheral or 'neighbor' devices to be considered when determining a density, such as a layout density, a gate density, an OD density, a metal density, or average density of the peripheral devices within the first bounding window, for example. In some embodiments, a size of the first bounding window is adjusted based on a sensitivity of a layer associated with the first device 122 or a process associated with the first device 122. Explained in another way, when a variation factor for a first characteristic is being determined for a first device, the first bounding window comprises a first size. However, when a variation factor for a second characteristic is being determined the first device, the first bounding window comprises a second size different from the first size, because the second characteristic is more or less sensitive than the first characteristic. In this way, a size for the first bounding window is determined based on a sensitivity of a layer associated with the first device or a process associated with the first device, for example.

In some embodiments, a variation factor library is created such that a first variation factor assigned to the first device 122 is stored for future reference. During a circuit design stage, when a device is arranged in a first design peripheral environment, the device in the first design peripheral environment is assigned the first variation factor associated with the first device 122, so long as the first design peripheral environment is configured in a similar fashion as the first peripheral environment 120 for the first device 122. Generally, a configuration associated with the first peripheral environment 120 comprises a number of peripheral devices within the peripheral environment and positions associated with the respective devices. As an example, with reference to FIG. 1, the first peripheral environment 120 of the first device 122 comprises two devices, such as the second device 132 and the third device 134. Additionally, devices 132 and 134 are located at a second position and a third position, respectively. During a circuit design stage, when a device is arranged in a first design peripheral environment comprising devices at positions corresponding to the second position and the third position, the device is assigned the first variation factor from the variation factor library. In this way, the variation factor library is implemented during a circuit design stage.

Figure 2:
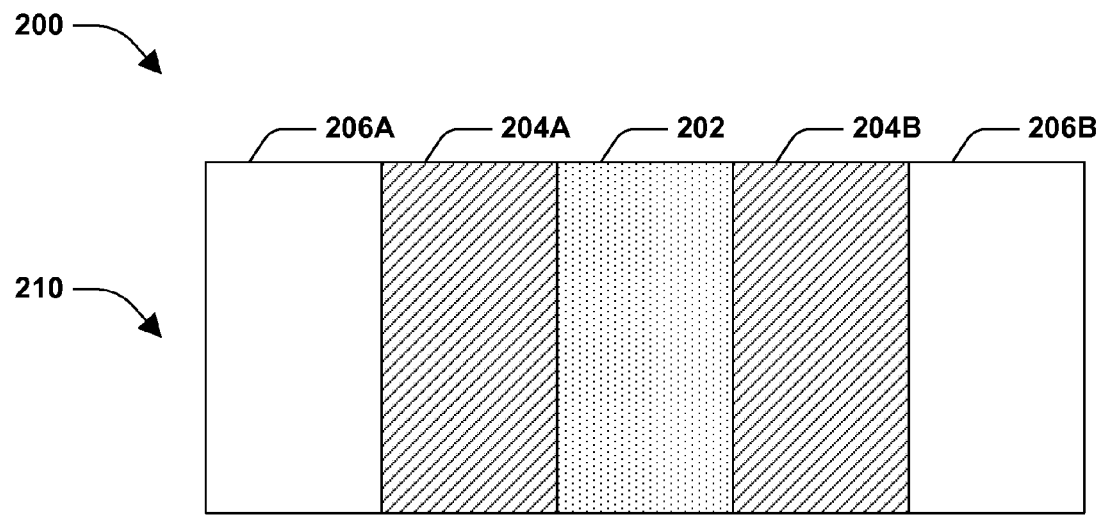
FIG. 2 is a layout view of blocks arranged within a die comprising one or more metal oxide semiconductor (MOS) devices, according to some embodiments.
Figure 2:
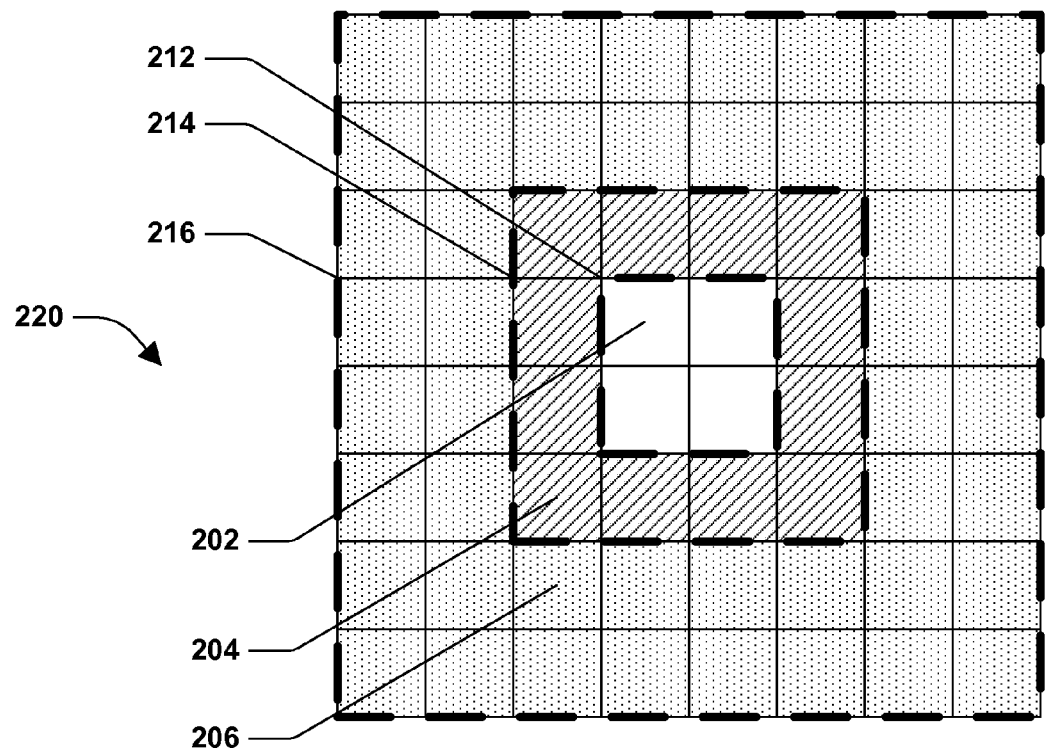

FIG. 2 is a layout view 200 of blocks arranged within a die comprising one or more metal oxide semiconductor (MOS) devices, according to some embodiments. In some embodiments, a peripheral environment comprises a layout structure. When the peripheral environment comprises the layout structure, one or more blocks of the layout structure are arranged in a regular fashion. In other words, the layout structure comprises an architecture due to a regularity in an arrangement of the layout structure. It will be appreciated that FIG. 2 depicts merely a few examples of various types of layout structures which can be implemented on within blocks of devices on a die.

At 210, a layout structure within a peripheral environment is illustrated. The layout structure is a flip structure 210 comprising one or more flip blocks. Generally a block, such as a flip block comprises one or more devices, such as transistors. In some embodiments, the flip structure 210 comprises a first flip block 202, a second flip block 204A, a third flip block 204B, a fourth flip block 206A, and a fifth flip block 206B. It will be appreciated that the second flip block 204A and the third flip block 204B comprise a substantially similar set of characteristics. Because of this, devices of the second flip block 204A and devices of the third flip block 204B are assigned a same variation factor, such as a second variation factor, while devices of the first flip block 202 are assigned a first variation factor different from the second variation factor. That is, a first device arranged within the first flip block 202 is assigned a first variation factor, while a second device arranged within the second flip block 204A or the third flip block 204B is assigned a second variation factor. Similarly, the fourth flip block 206A and the fifth flip block 206B comprise a substantially similar set of characteristics as well. Because of this, devices of the fourth flip block 206A and devices of the fifth flip block 206B are assigned a same variation factor, such as a third variation factor different from the second variation factor and the first variation factor. That is, a first device arranged within the first flip block 202 is assigned a first variation factor, a second device arranged within the second flip block 204A or the third flip block 204B is assigned a second variation factor, and a third device arranged within the fourth flip block 206A or the fifth flip block 206B Is assigned a third variation factor.

In some embodiments, a block level variation is determined based on a characteristic difference between two flip blocks, such as a first flip block and a second flip block. For example, the first flip block 202 and the second flip block 204A or the third flip block 204B are associated with a first block level variation due to architectural, structural, or density differences between the first flip block 202 and flip blocks 204A and 204B. Similarly, the second flip block 204A and the fourth flip block 206A are associated with a second block level variation and the third flip block 204B and the fifth flip block 206B are associated with the second block level variation as well.

At 220, a layout structure within a peripheral environment is illustrated. The layout structure is an array structure 220 comprising one or more array blocks. Generally a block, such as an array block comprises one or more devices, such as transistors. In some embodiments, the array structure 220 comprises a first array block 202, a second array block 204, and a third array block 206. The first array block 202 is defined by boundary 212, the second array block 204 is defined by boundaries 212 and 214, and the third array block 206 is defined by boundaries 214 and 216. It will be appreciated that devices within a block comprise a substantially similar set of characteristics, and are thus assigned a same variation factor. Because of this, devices within the first array block 202 are assigned a first variation factor, devices within the second array block 204 are assigned a second variation factor, and devices within the third array block 206 are assigned a third variation factor. It will be appreciated that the first variation factor, the second variation factor, and the third variation factor are different from one another.

In some embodiments, a block level variation is determined based on a characteristic difference between two array blocks, such as a first array block and a second array block. For example, the first array block 202 and the second array block 204 are associated with a first block level variation due to architectural, structural, or density differences between the respective blocks. Similarly, the second array block 204 and the third array block 206 are associated with a second block level variation.

In some embodiments, a variation factor library is created such that a first variation factor assigned to devices of a first block, such as the first flip block 202 or the first array block 202, is stored for future reference. During a circuit design stage, when a device is arranged in a first design peripheral environment associated with a design layout structure, the device in the first design peripheral environment is assigned the first variation factor associated with the first block, so long as the design layout structure is configured in a similar fashion as a layout structure associated with the first block. That is, when a design flip structure in a first design peripheral environment is laid out similarly to the flip array of 210, a block corresponding to the first flip block 202 in the design flip structure is assigned the first variation factor of the first flip block 202. Additionally, blocks corresponding to the second, third, fourth, and fifth flip blocks of 210 are assigned corresponding variation factors. It will be appreciated that array blocks in a design peripheral environment are assigned variation factors in a similar manner. In this way, the variation factor library is implemented during a circuit design stage.

FIG. 3 is a layout view 300 of a die comprising one or more metal oxide semiconductor (MOS) devices, according to some embodiments. The die 310 of FIG. 3 comprises a first peripheral environment 320 for a first device 322 and a second peripheral environment 330 for a second device. The first peripheral environment 320 is determined to be a first instance because no regular structure or architecture is seen within 320. A first variation factor is determined for the first device 322 based on a first bounding window formed by the perimeter of the first peripheral environment 320. A density, such as a gate density, an OD density, or a metal density, is calculated for one or more peripheral devices (not shown) within the first bounding window. Such densities, etc. are used to determine the first variation factor for the first device 322. In some embodiments, the first bounding window is created for the first instance such that a bounding window size is based on a sensitivity of a layer associated with the first device 322 or a process associated with the first device 322.

The second peripheral environment 330 is a second layout structure because the second peripheral environment 330 encompasses a second array structure. The second array structure comprises a first array block 332, a second array block 334, a third array block 336, and a fourth array block 338. Because the second array structure comprises a second architecture such that the first array block 332 and the second array block 334 share similar characteristics and the third array block 336 and the fourth array block 338 share similar characteristics, the first and second array blocks 332 and 334 are assigned a second variation factor, while the third and fourth array blocks 336 and 338 are assigned a third variation factor. The first variation factor assigned to the first device 322, the second variation factor assigned to the first array block 332 and the second array block 334, and the third variation factor assigned to array blocks 336 and 338 are distinct or different from one another because corresponding devices or blocks are associated with different sets of characteristics.

Figure 4:
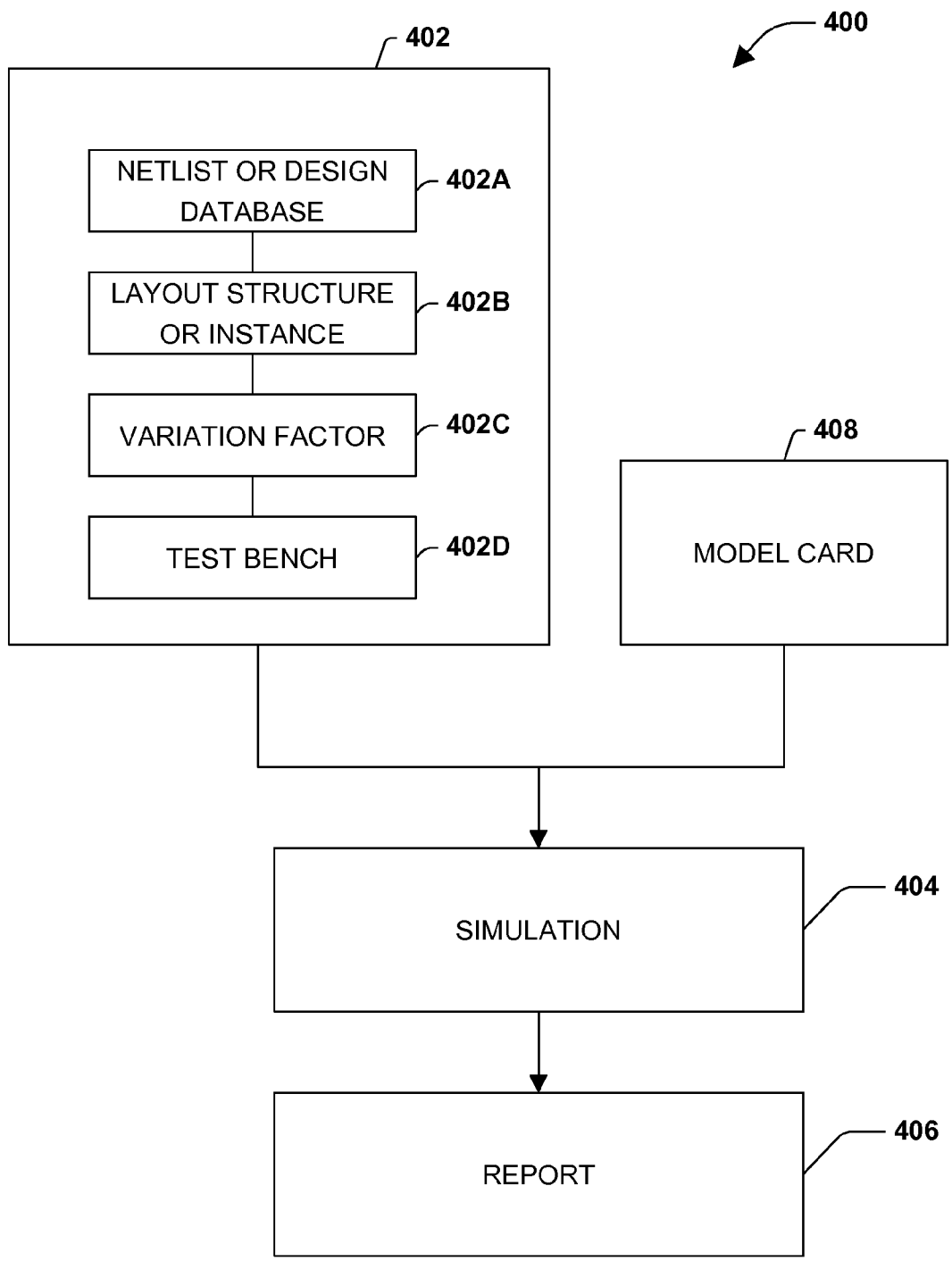
FIG. 4 is a flow diagram of a method for variation factor assignment, according to some embodiments.

FIG. 4 is a flow diagram of a method 400 for variation factor assignment, according to some embodiments. In some embodiments, the method 400 comprises data preparation at 402. For example, the data preparation 402 comprises receiving a netlist or design database 402A. Often, the netlist of 402A is associated with one or more devices of a circuit and one or more connections for the one or more respective devices. A netlist, at times, means a circuit in text format, whereas a design database generally represents an in-memory circuit. At 402B, a peripheral environment of a device is determined to be a layout structure or an instance. At 402C, a variation factor is assigned to the device based on the peripheral environment of the device. At 402D, the variation factor of 402C is assembled for test bench simulation. At 404, the circuit associated with the netlist 402A is simulated by a circuit simulator based on variation factor data 402C and results of the simulation are reported at 406. In some embodiments, the simulation at 404 and results reported at 406 are based upon a model card at 408, where a model card typically originates from a foundry and a test bench typically comes from a design.

Figure 5:
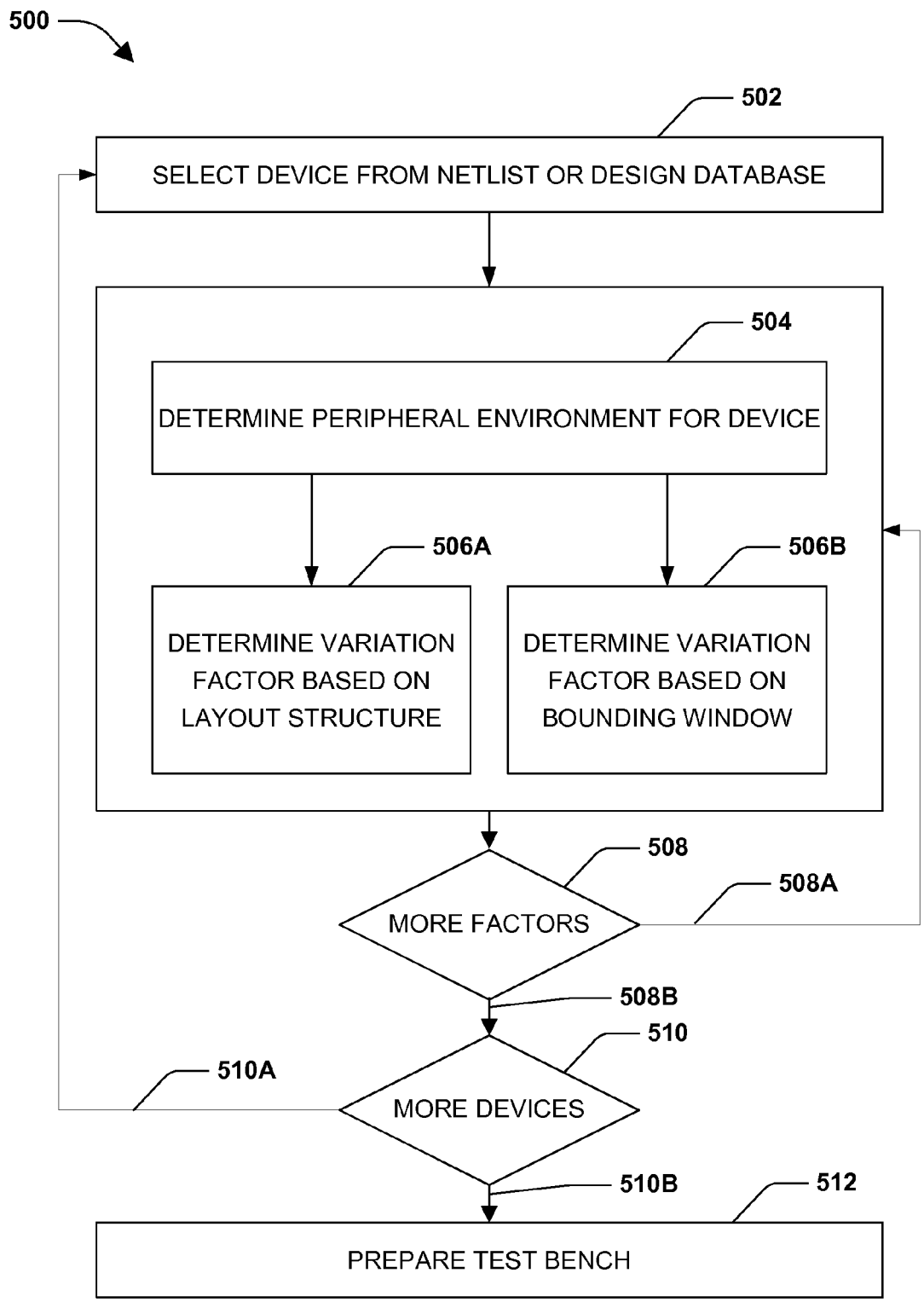
FIG. 5 is a flow diagram of a method for variation factor assignment, according to some embodiments.

FIG. 5 is a flow diagram of a method 500 for variation factor assignment, according to some embodiments. At 502, the method comprises selecting a device from a netlist or a design database for variation factor assignment. At 504, a peripheral environment is determined for the device. Generally, the peripheral environment is either an instance or a layout structure. At 506A, a variation factor is determined based on an architecture of a layout structure within the peripheral environment. At 506B, when the peripheral environment is determined to be an instance, the variation factor is determined based on a bounding window for the peripheral environment. At 508, if more variation factors are to be determined for the device, the method 500 loops back 508A to determining a peripheral environment 504 or determining variation factors at 506A or 506B. When no more variation factors are to be determined for the device 508B, the method 500 checks to see whether more devices are to have variation factors assigned at 510. When more devices are to have variation factors assigned, the method loops back 510A to select another device at 502 from the netlist or the design database. When variation factor assignment is complete at 510B, a test bench is prepared at 512 for simulation.

Figure 6:
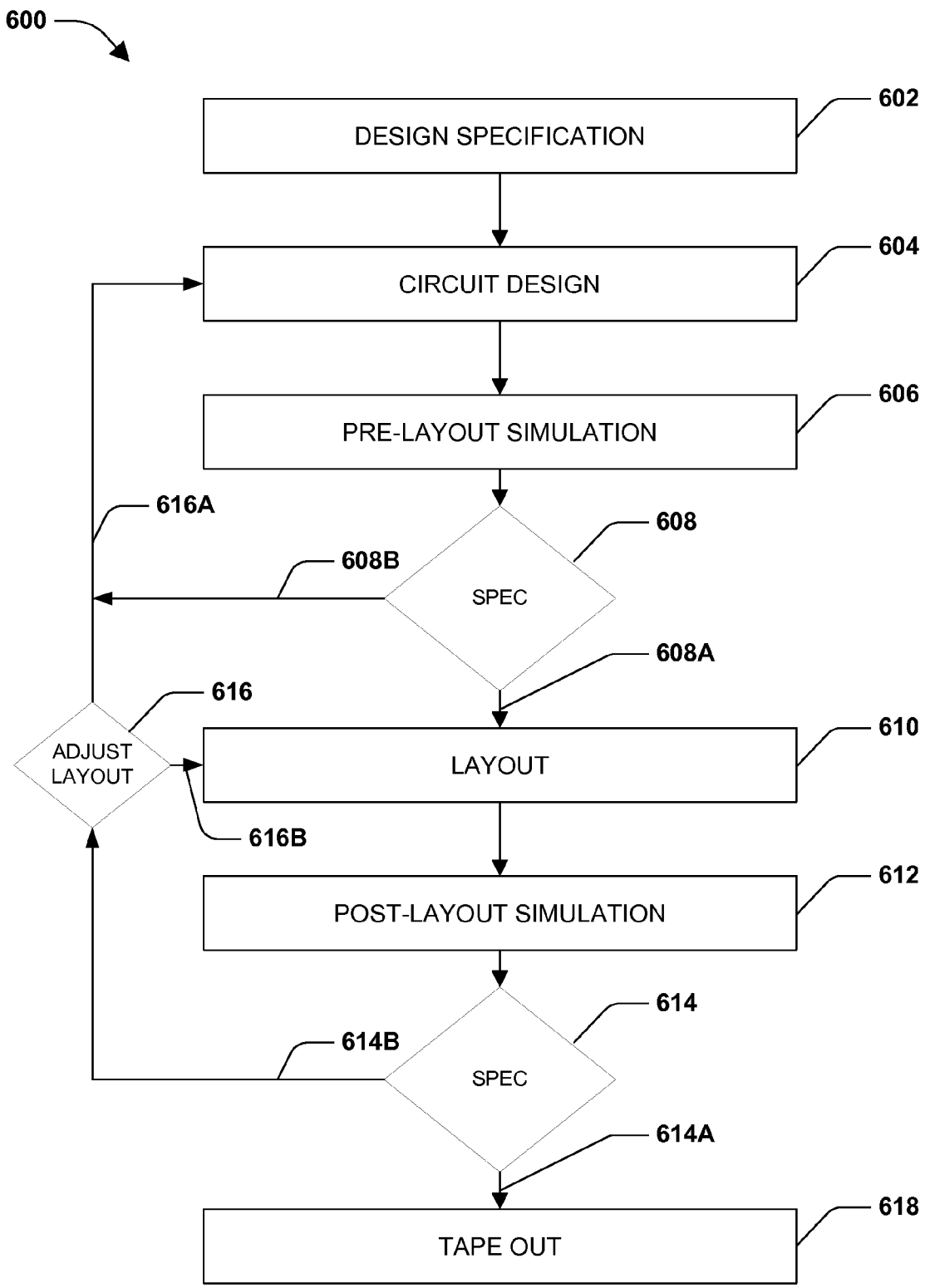
FIG. 6 is a flow diagram of a method for variation factor assignment during a reference design flow, according to some embodiments.

FIG. 6 is a flow diagram of a method 600 for variation factor assignment during a reference design flow, according to some embodiments. The method 600 comprises receiving a set of design specifications at 602. At 604, the design specifications are used to design a circuit during a circuit design stage. At 606, a pre-layout simulation is run based on the circuit design of 604. In some embodiments, the pre-layout simulation uses variation factors implemented from a variation factor library to simulate results. At 608, simulation results are checked to see if they meet specifications, such as the design specifications of 602. If results are not in accordance 608B with design specifications, additional circuit design 604 is done. At 608A, the method 600 continues to layout 610 of the circuit design from 604. Post-layout simulation is run at 612, and results are determined for the post-layout simulation. During post-layout simulation, a first device on a die and a second device on the same die are assigned differing variation factors based on their respective peripheral environments. In this way, the respective variation factors are modeled at a block level within the die, which is generally finer than at the die level. At 614, post-layout simulation results are checked. If additional design is desired 614B, the layout design is adjusted 616 at 616B or the circuit design is adjusted at 616A. At 614A, the method 600 continues on to tape out at 618.

Figure 7:
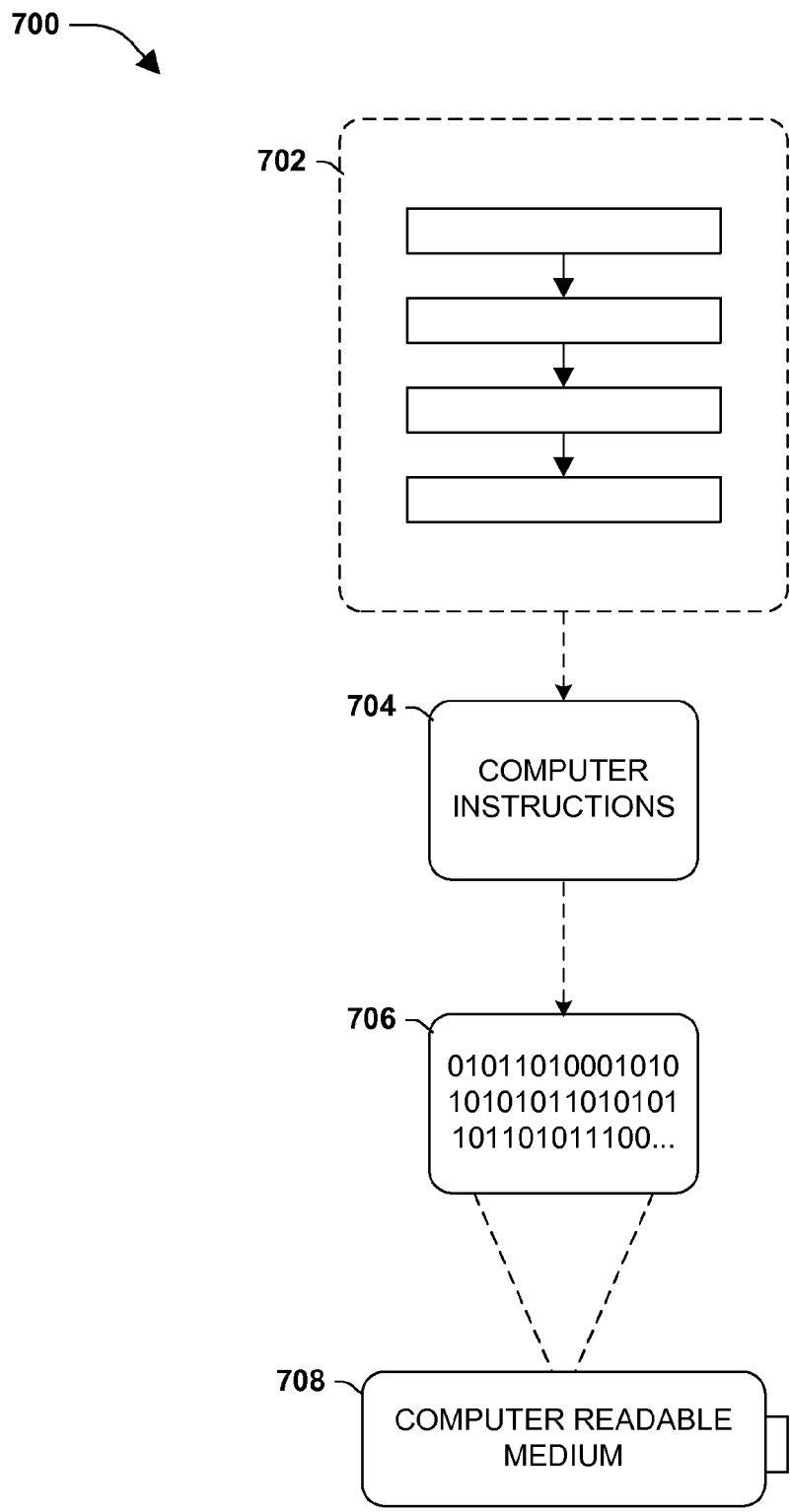
FIG. 7 is an illustration of a computer-readable medium or computer-readable device comprising processor-executable instructions configured to embody one or more of the provisions set forth herein, according to some embodiments.

Still another embodiment involves a computer-readable medium comprising processor-executable instructions configured to implement one or more embodiments of the techniques presented herein. An embodiment of a computer-readable medium or a computer-readable device that is devised in these ways is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 are configured to perform a method 702, such as at least some of the exemplary method 400 of FIG. 4. In another embodiment, the processor-executable instructions 704 are configured to implement a system. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
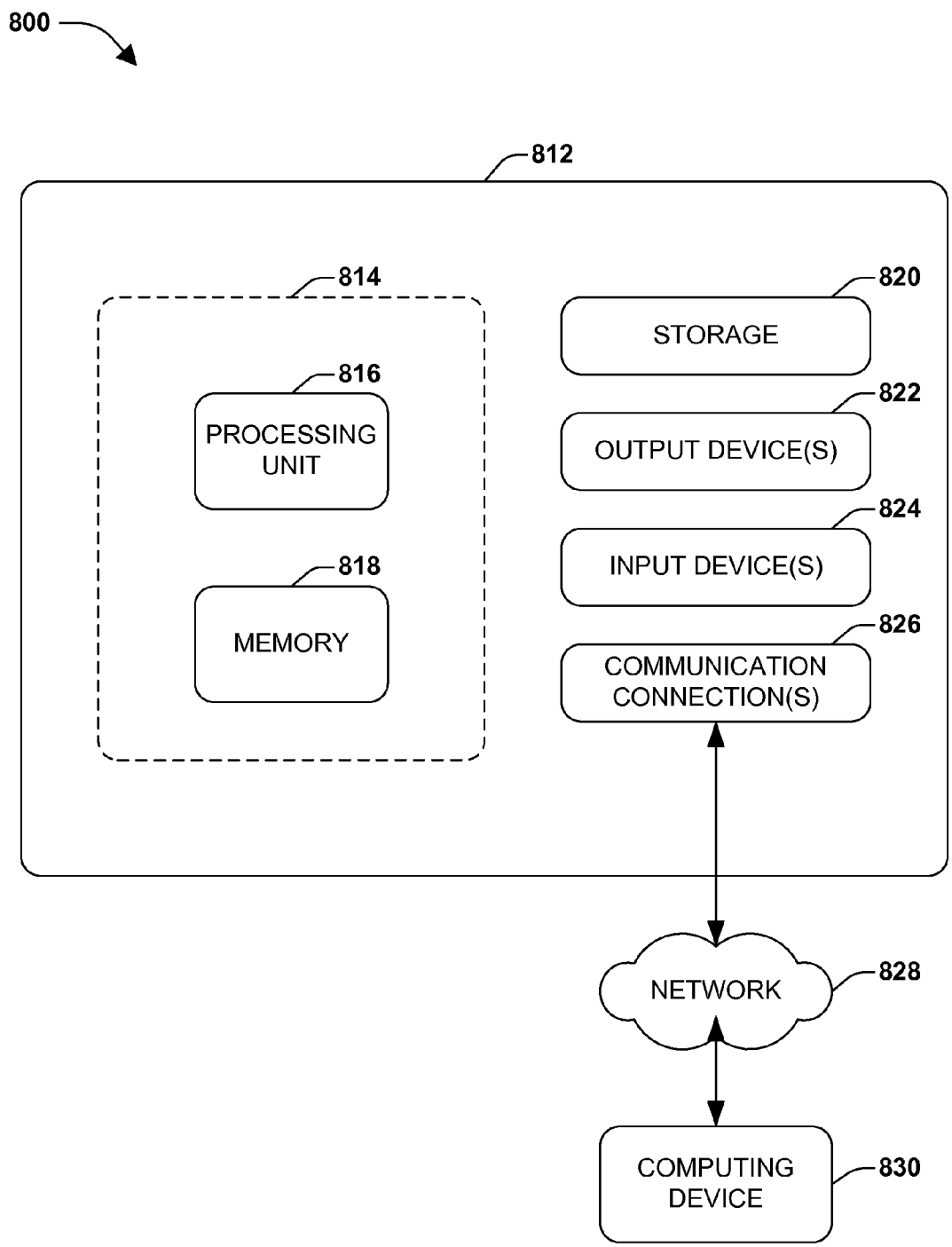
FIG. 8 is an illustration of a computing environment where one or more of the provisions set forth herein are implemented, according to some embodiments.

FIG. 8 illustrates a system 800 comprising a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or some combination of the two. This configuration is illustrated in FIG. 8 by dashed line 814.

In other embodiments, device 812 includes additional features or functionality. For example, device 812 also includes additional storage such as removable storage or non-removable storage, including, but not limited to, magnetic storage, optical storage, and the like. Such additional storage is illustrated in FIG. 8 by storage 820. In some embodiments, computer readable instructions to implement one or more embodiments provided herein are in storage 820. Storage 820 also stores other computer readable instructions to implement an operating system, an application program, and the like. Computer readable instructions are loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device are also included in device 812. Input device(s) 824 and output device(s) 822 are connected to device 812 via a wired connection, wireless connection, or any combination thereof. In some embodiments, an input device or an output device from another computing device are used as input device(s) 824 or output device(s) 822 for computing device 812. Device 812 also includes communication connection(s) 826 to facilitate communications with one or more other devices.

One or more embodiments of techniques or systems for assigning a variation factor to a device at a block level are provided herein. Generally, a die comprises one or more blocks of devices, such as transistors. A first device is associated with a first peripheral environment and a second device is associated with a second peripheral environment. When the first peripheral environment is different from the second peripheral environment, the first device is assigned a first variation factor while the second device is assigned a second variation factor different from the first variation factor. A peripheral environment is an instance or a layout structure. An instance is a peripheral environment with no regular structure, while a layout structure is an array structure, a flip structure, etc. In this way, different variation factors are applied to different devices across a same die.

According to some aspects, a method for variation factor assignment is provided, comprising determining a first peripheral environment in which a first device is arranged. For example, the first peripheral environment comprises at least one of a first layout structure or a first instance. The method comprises assigning a first variation factor to the first device based on the first peripheral environment. The assigning comprises determining the first variation factor based on a first architecture associated with the first layout structure within the first peripheral environment. The assigning comprises determining the first variation factor based on a first bounding window associated with the first instance within the first peripheral environment.

According to some aspects, a method for variation factor assignment is provided, comprising assigning a first variation factor to a first device arranged within a first peripheral environment of a die based on the first peripheral environment. For example, the first peripheral environment comprises at least one of a first layout structure or a first instance. The assigning comprises determining the first variation factor based on a first architecture associated with the first layout structure within the first peripheral environment. The assigning comprises determining the first variation factor based on a first bounding window associated with the first instance within the first peripheral environment. The method comprises assigning a second variation factor to a second device arranged within a second peripheral environment of the die, the second variation factor different from the first variation factor.

According to some aspects, a method for variation factor assignment is provided, comprising receiving a netlist or design database associated with one or more devices of a circuit and one or more connections for the one or more respective devices. The method comprises assigning a first variation factor to a first device arranged within a first peripheral environment of a die based on the first peripheral environment.

Although the subject matter has been described in language specific to structural features or methodological acts, it is to be understood that the subject matter of the appended claims is not necessarily limited to the specific features or acts described above. Rather, the specific features and acts described above are disclosed as exemplary embodiments.

Various operations of embodiments are provided herein. The order in which some or all of the operations are described should not be construed as to imply that these operations are necessarily order dependent. Alternative ordering will be appreciated based on this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for variation factor assignment, comprising:
    determining a first peripheral environment for a first device within a die, the first peripheral environment corresponding to a neighborhood around the first device and comprising at least one of a first layout structure or a first instance; and
    assigning a first variation factor to the first device, the first variation factor indicative of an expected variance in at least one electrical characteristic of the first device and determined based on the first peripheral environment, the assigning comprising at least one of:

determining the first variation factor based on a first architecture associated with the first layout structure within the first peripheral environment; or determining the first variation factor based on a first bounding window associated with the first instance within the first peripheral environment, at least one of the determining or the assigning implemented by a processing unit.

2. The method of claim 1, comprising determining the first layout structure of the first peripheral environment to be a first array structure comprising one or more array blocks:

the first device arranged within a first array block of the one or more array blocks; and a second device arranged within a second array block of the one or more array blocks.

3. The method of claim 2, comprising assigning the first variation factor to the first device based on a block level variation between the first array block and the second array block.

4. The method of claim 3, comprising calculating the block level variation based on at least one of a gate density or a metal density of at least one of the first array block or the second array block.

5. The method of claim 1, comprising creating the first bounding window to delineate the first peripheral environment from another portion of the die.

6. The method of claim 1, comprising determining a first bounding window size for the first bounding window based on at least one of a sensitivity of a layer associated with the first device or a process associated with the first device.

7. The method of claim 1, comprising:

calculating at least one of a gate density or a metal density of the first peripheral environment; and determining the first variation factor for the first device based on at least one of the gate density or the metal density of the first peripheral environment.

8. The method of claim 1, comprising creating a variation factor library for the first device, the variation factor library associated with the first peripheral environment and the first variation factor.

9. The method of claim 8, comprising implementing the variation factor library by assigning the first variation factor to a device in a circuit design environment arranged within a first design peripheral environment substantially similar to the first peripheral environment.

10. The method of claim 1, comprising assigning the first variation factor to the first device based on at least one of a process corner, a process voltage, or a device type associated with the first device.

11. A method for variation factor assignment, comprising:

assigning a first variation factor to a first device within a die based on a first peripheral environment corresponding to a neighborhood around the first device, the first variation factor indicative of an expected variance in at least one electrical characteristic of the first device and the first peripheral environment comprising at least one of a first layout structure or a first instance, the assigning comprising at least one of:

determining the first variation factor based on a first architecture associated with the first layout structure within the first peripheral environment; or determining the first variation factor based on a first bounding window associated with the first instance within the first peripheral environment; and assigning a second variation factor to a second device within the neighborhood around the first device, the second variation factor indicative of an expected variance in at least one electrical characteristic of the second device, the second variation factor different from the first variation factor, at least one of the assigning a first variation factor or the assigning a second variation factor implemented by a processing unit.

12. The method of claim 11, comprising assigning the second variation factor to the second device based on a second peripheral environment corresponding to a second neighborhood around the second device, the second peripheral environment comprising at least one of a second layout structure or a second instance.

13. The method of claim 12, comprising:

determining the second variation factor based on a second architecture associated with the second layout structure within the second peripheral environment; or determining the second variation factor based on a second bounding window associated with the second instance within the second peripheral environment.

14. The method of claim 13, comprising creating the second bounding window for the second instance of the second peripheral environment.

15. The method of claim 13, comprising determining a second bounding window size for the second bounding window based on at least one of a sensitivity of a layer associated with the second device or a process associated with the second device.

16. The method of claim 11, comprising creating the first bounding window for the first instance to delineate the first peripheral environment from another portion of the die.

17. The method of claim 11, comprising determining a first bounding window size for the first bounding window based on at least one of a sensitivity of a layer associated with the first device or a process associated with the first device.

18. The method of claim 11, comprising creating a variation factor library for the first device, the variation factor library associated with the first peripheral environment and the first variation factor.

19. The method of claim 18, comprising implementing the variation factor library during a circuit design stage by assigning the first variation factor to a device in a circuit design environment arranged within a first design peripheral environment substantially similar to the first peripheral environment.

20. A method for variation factor assignment, comprising:

determining a first size of a first bounding window for a first device within a die based upon a sensitivity of a layer associated with the first device to a first electrical characteristic, the first bounding window defining a first peripheral environment for the first device, the first peripheral environment corresponding to a first neighborhood around the first device, the first neighborhood comprising a first set of one or more other devices within the die;

assigning a first variation factor to the first device based on the first peripheral environment, to determine a first expected variance in the first electrical characteristic of the first device based on the first neighborhood around the first device;

determining a second size of a second bounding window for the first device based upon a sensitivity of the layer to a second electrical characteristic, the second bounding window defining a second peripheral environment for the first device, the second peripheral environment corresponding to a second neighborhood around the first device, the second neighborhood comprising a second set of one or more other devices within the die; and assigning a second variation factor to the first device based on the second peripheral environment, to determine a second expected variance in the second electrical characteristic of the first device based on the second neighborhood around the first device, wherein:
the second size is different than the first size,
the second electrical characteristic is different than the first electrical characteristic;
the second neighborhood is different than the first neighborhood; and
the second variation factor is different than the first variation factor, at least some of the method implemented by a processing unit.

* * * * *